United States Patent [19]

Haynes et al.

[11] Patent Number: 4,707,365
[45] Date of Patent: Nov. 17, 1987

[54] FLAVOR SYSTEM HAVING HIGH CHOCOLATE FLAVOR IMPACT

[75] Inventors: Louis V. Haynes, Cincinnati; Phillip F. Pflaumer, Ross; George P. Rizzi, Cincinnati; Bruce A. Roberts, Batavia, all of Ohio

[73] Assignee: The Procter & Gamble Co., Cincinnati, Ohio

[21] Appl. No.: 741,384

[22] Filed: Jun. 5, 1985

[51] Int. Cl.$^4$ ............................................. A21D 13/08
[52] U.S. Cl. ..................................... 426/94; 426/306; 426/631; 426/554; 426/549; 426/613
[58] Field of Search ................. 426/94, 554, 613, 306, 426/631, 584, 549

[56] References Cited

U.S. PATENT DOCUMENTS

| | | | |
|---|---|---|---|
| 3,037,864 | 6/1962 | Bedenk | 426/554 |
| 3,170,796 | 2/1965 | Andre | 426/554 |
| 3,433,649 | 3/1969 | Cooke | 426/613 |
| 3,459,556 | 8/1969 | Musashino et al. | |
| 3,579,353 | 5/1971 | Nakel et al. | |
| 3,694,230 | 9/1972 | Cooke | 426/554 |
| 3,733,209 | 5/1973 | Gupta | 426/554 |
| 4,344,969 | 4/1982 | Youngquist | 426/18 |
| 4,455,333 | 6/1984 | Hong et al. | 426/94 |
| 4,503,080 | 3/1985 | Brables et al. | 426/94 |

OTHER PUBLICATIONS

Admitted State of the Art; Chocolate Liquor, item No. 80–002 sold by Comet Confectionary Limited. Admitted State of the Art; Description of Certain Commercial chocolate Products (Disclosure Statement).
Cook, Chocolate Production and Use, Magazines for Industry, Inc., N.Y. 1963, pp. 189–197, 218, 219 & 222–224 Matz, Cookie and Cracker Technology, The Avi Pub. Co. Inc., Westport, Connecticut, 1969, pp. 174–178.
Ziegleder et al., "Determination of the Degree of Roasting of Cocoa by High-pressure Liquid Chromatography", *Deut. Lebensmittel-Rundschau*, vol. 79 (1983) pp. 343–347.
Ziegleder, "Highly-Volatile Cocoa-Flavor Constituents as Indicators During Cocoa Processing", *CCB Reviews of Chocolate, Confectionary, and Biscuit Technology*, vol. 7, (1982), pp. 17–22.

Primary Examiner—Joseph Golian
Attorney, Agent, or Firm—Eric W. Guttag; Bart S. Hersko; Steven J. Goldstein

[57] ABSTRACT

A natural chocolate flavor system having high chocolate flavor impact is disclosed. This system has: (1) a high level of cocoa solids; (2) a high level of a mixture of pyrazines; and (3) high ratios of certain dimethyl pyrazines to trimethyl and tetramethyl pyrazines. This chocolate flavor system is useful in formulating chocolate chips and chocolate coatings for storage-stable crisp and chewy cookies.

6 Claims, 1 Drawing Figure

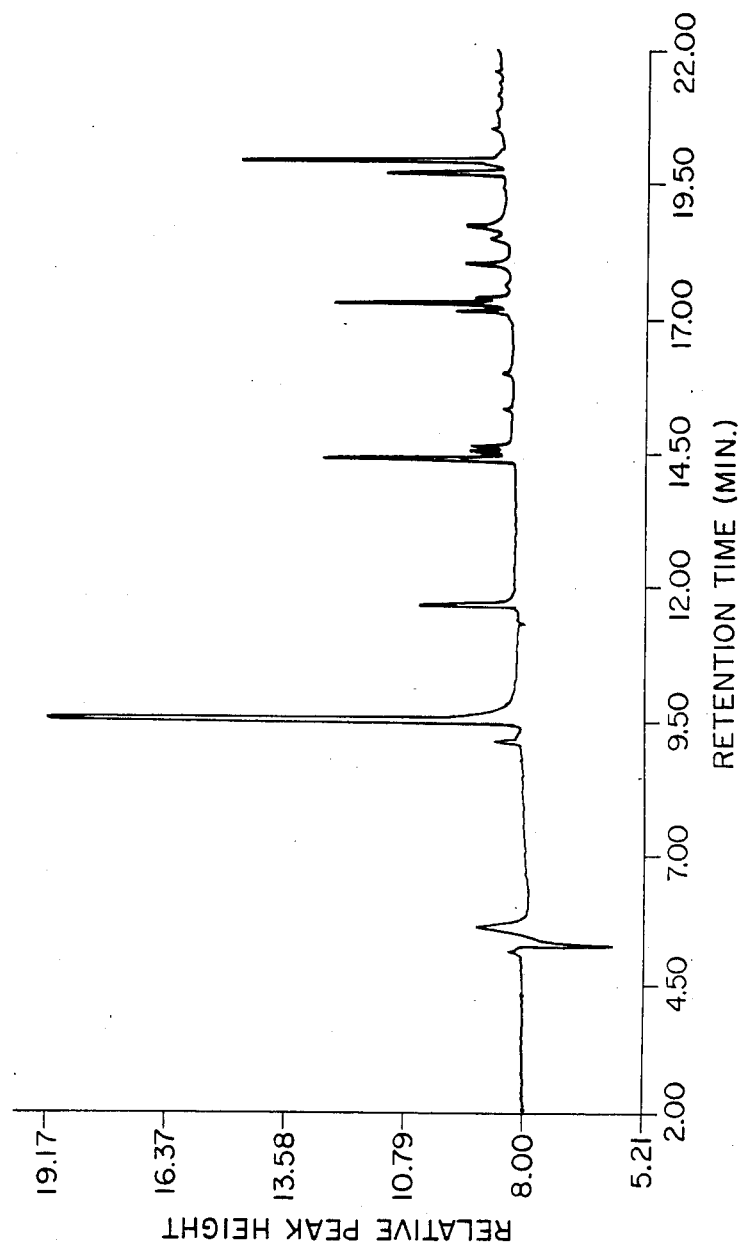

FLAVOR SYSTEM HAVING HIGH CHOCOLATE FLAVOR IMPACT

TECHNICAL FIELD

This application relates to a flavor system having high chocolate flavor impact useful in formulating chocolate chips and other chocolate flavored products for baked goods. Fresh, home-baked cookies are the standard of excellence in the cookie world. The dominant characteristic of such cookies is the texture, specifically, a crisp outside surface and a chewy interior. The interior contains pockets of super-saturated sugar solution (syrup) which are ductile and are sometimes visible as strands when the cookie is pulled apart. Unfortunately, within a few weeks or less, such home-baked cookies undergo a spontaneous and irreversable process of degradation, becoming hard and crumbly throughout.

The problem of storage-stability for these dual-textured cookie products has been solved. In particular, U.S. Pat. No. 4,455,333 to Hong et al., issued June 19, 1984, discloses cookie products having distributed therein discrete regions having a crisp texture and discrete regions having a chewy texture. Most importantly, these crisp and chewy regions remain storage-stable over time, i.e., the process of degradation occurring in fresh, home-baked cookies does not occur or occurs much more slowly. Other examples of these storage-stable, dual-textured cookies are disclosed in U.S. Pat. No. 4,344,969 to Youngquist, et al, issued Aug. 17, 1982 and U.S. Pat. No. 4,503,080 to Brabbs et al., issued Mar. 5, 1985.

The storage-stable, dual-textured cookies of the Hong et al. patent can contain chocolate chips. It has been found that the chocolate chips previously used in such cookies lose chocolate flavor impact on aging. This aging problem has been found to be due to the higher water activity of the cookie crumb relative to the much lower water activity of the chocolate chips. Specifically, the moisture in the cookie crumb diffuses into the chips and desorbs the chocolate flavor compounds present therein. These desorbed compounds then diffuse back into the cookie crumb.

The desorbed flavor compounds present in the cookie crumb have been found not to provide much of a chocolate flavor impact. The result is chocolate chip cookies which have less chocolate flavor impact over time. Accordingly, it would be desirable to solve this problem of lost chocolate flavor impact in the storage-stable dual-texture chocolate chip cookies of the Hong et al. patent.

BACKGROUND ART

A. Ready to Serve Cookies Having Storage Stable Crisp and Chewy Textures

U.S. Pat. No. 4,455,333 to Hong et al, issued June 19, 1984, discloses ready-to-serve cookies having storage-stable crisp and chewy textures. A preferred example of these dual-texture cookies are those containing chocolate chips. See also, U.S. Pat. No. 4,344,969 to Youngquist et al. issued Apr. 17, 1982 (use of enzymes to make storage-stable crisp and chewy cookies which can have chocolate chips); U.S. Pat. No. 4,503,080 to Brabbs et al., issued Mar. 5, 1985 (use of crystallization inhibitors to make storage-stable crisp and chewy cookies which can have chocolate chips).

B. Determining Degree of Roasting of Cocoa by Measuring Pyrazine Level

Ziegleder et al, "Determination of the Degree of Roasting of Cocoa by High-Pressure Liquid Chromatography," *Deut. Lebensmittel Rundschau*, Volume 79, (1983), pp 343–47, teaches that cocoa aroma is mainly influenced by the degree of roasting. The authors state that the roast intensity of cocoa can be estimated by high performance liquid chromatography of the methylated pyrazines in the cocoa aroma. The authors also say that these pyrazine derivatives develop specifically with increasing roast intensity so that their concentration ratios to one another reflect (fingerprint) the degree of roasting. See also Ziegleder, "Highly-Volatile Cocoa-flavor Constituents as Indicators During Cocoa Processing", *CCB Reviews of Chocolate, Confectionary, and Biscuit Technology*, Volume 7, (1982), pp 17–22, for a similar teaching.

C. Use of Methyl Substituted Pyrazines in Chocolate Flavors

U.S. Pat. No. 3,459,556 to Musashino et al issued Aug. 5, 1969, teaches improving the flavor of vanilla-containing cocoa-flavor and chocolate-flavor materials by adding methyl substituted pyrazines, in particular tetramethyl pyrazine. See also, U.S. Pat. No. 3,579,353 to Nakel et al., issued May 18, 1971, which discloses the use of alkyl-substituted pyrazines in food products, including cocoa and chocolate.

DISCLOSURE OF THE INVENTION

The present invention relates to a chocolate flavor system which overcomes the problem of lost chocolate flavor impact for chocolate products, such as chocolate chips, which are used in baked goods, such cookies, having regions of relatively high water activity. The key is to use a natural chocolate flavor system which has: (1) a high level of cocoa solids; (2) a high level of a mixture of pyrazines; and (3) high ratios of certain dimethyl pyrazines to trimethyl and tetramethyl pyrazines. By using this chocolate flavor system, chocolate flavored products such as chocolate chips or chocolate flavored coatings can be formulated which have desirable chocolate flavor impact over time even when used in relatively high water activity baked goods such as cookies, brownies and cakes. This chocolate flavor system can be also used to formulate highly desirable cocoa powders.

A. Definitions

As used herein, "natural chocolate flavor system" refers to a chocolate flavor system which is developed through the roasting of cacao beans.

As used herein, "chocolate liquor" refers to the solid or semi-plastic food prepared by finely grinding cacao nibs. Chocolate liquor usually contains from about 50 to about 58% by weight cocoa butter fat.

As used herein, "cocoa powder" refers to the residual material remaining after part of the cocoa butter fat has been removed from ground cacao nibs. Cocoa powder usually contains from about 10 to about 22% by weight cocoa butter fat.

As used herein, "cocoa solids" refers to the nonfat constituents of chocolate liquor and cocoa powder.

As used herein, "crumb-continuous" refers to cookies which typically have a relatively uniform distribution of the crumb ingredients throughout the cookie. This is in distinction to the filled, and sandwich-type cookies known to the art.

By "storage-stable" is meant that the cookies, after reaching substantial textural equilibrium, retain a plurality of textures for extended periods. Depending upon their formulation, cookies prepared herein will, after equilibration, retain their original texture for periods ranging from weeks, at a minimum, to many months, or even indefinitely, with proper packaging and maintenance of package integrity.

By "substantial textural equilibrium" is meant the point at which those physico-chemical and structural features responsible for texture, and those physicochemical and structural processes responsible for changes in texture have reached an approximately steady state relative to the expected usable life and storage conditions of the product.

By "cookie ingredients" is meant those ingredients commonly used in cookies, namely, sugar, flour, water, and shortening, as well as those additional flavoring and texturing ingredients desired in the particular system being formulated. Such latter ingredients would include nutmeats, cereals, and raisins, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without heat and/or steam treatment.

The term "water activity" ($a_w$) is used herein in its usual context to mean the ratio of the fugacity of water in the system being studied (f) to the fugacity of pure water ($f_o$) at the same temperature. The water activity of the products and compositions herein can be measured using well-known physical chemical techniques and commercially available instruments.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard.

By "sugar crystallization inhibitor" is meant a compound or composition which inhibits the crystallization of sucrose or other readily-crystallizable sugars in the baked cookie, so that the sugar crystallizes, at the water content and water activity encountered in semi-moist cookies of the home-baked type, substantially more slowly than the same sugar would under the same conditions in the absence of the inhibitor.

By "crystallization-resistant sugar" is meant a mono- or disaccharide, or mixture of mono- and/or disaccharides, which crystallizes, at the water content and water activity encountered in the semi-moist cookies of the home-baked type, substantially more slowly than sucrose under the same conditions, typically remaining uncrystallized for periods of at least 1-6 months. Particulary good crystallization-resistant sugars are fructose, dextrose, and mixtures of sugars of which fructose and dextrose together comprise at least about 15% by weight, and solutions thereof.

"Monosaccharides" and "disaccharides" as used herein are compounds well known to the art. Monosaccharides have the empirical formula $(CH_2O)_n$, where n is equal to or greater than 3. The carbon skeleton of the common monosaccharides is unbranched and each carbon except one bears an —OH group; the remaining carbon is generally combined in an acetal or ketal linkage. Disaccharides consist of two monosaccharides joined by a glycosidic linkage.

By "baking" herein is meant radiant, conductive, or convective exposure to energy of a type which imparts thermal energy to the product being baked. It thus includes conventional, convection, dielectric and microwave oven baking.

The term "laminated" is used herein to indicate discrete regions of one or more textures in a baked product, specifically discrete regions of crisp and chewy textures. It includes but is not limited to superimposed layers of one or more materials.

The term "chewy dough" is used to denote a dough that will have a chewy texture after baking and equilibrating.

The term "crisp dough" is used to denote a dough that will have a crisp texture after baking and equilibrating.

By "shortening" is meant an edible triglyceride fat based compound suitable for cooking or baking. Although a suitable emulsifier can be included, the term "shortening" as used herein does not include an emulsifier.

As used herein, the term "comprising" means various compatible components can be formulated together. The term "comprising" encompasses the more restrictive terms "consisting essentially of" and "consisting of".

B. Chocolate Flavor System

A key component of the natural chocolate flavor system of the present invention are the cocoa solids. These cocoa solids are typically present in this system at higher than their normal levels. The particular level of cocoa solids present in this flavor system will depend upon the chocolate product where the flavor system is used. In the case of chocolate chips and chocolate coatings to be defined hereafter, the cocoa solids are present at a level of at least about 21% by weight of the chip or at least about 16% by weight of the coating. Preferably, the cocoa solids are present at a level from about 21% to about 35% by weight for both the chips and the coatings. In the case of cocoa powders to be defined hereafter, the cocoa solids are present at a level of from about 78 to about 90% by weight of the powder.

Another key aspect of this flavor system is a high level of a mixture of pyrazines which are formed during roasting of cacao beans. This mixture includes methyl pyrazine, 2,5 and 2,6-dimethyl pyrazines (hereafter 2,5/2,6-dimethyl pyrazines), ethyl pyrazine, 2,3-dimethyl pyrazine, 2,3,5-trimethyl pyrazine (hereafter trimethyl pyrazine), and 2,3,5,6-tetramethyl pyrazine (hereafter tetramethyl pyrazine). For chocolate chips and chocolate coatings to be defined hereafter, this mixture of pyrazines can be present in natural chocolate flavor systems of the present invention at a level from about 3 to about 15 ppm, preferably, at a level of from about 3.5 to about 14 ppm. For cocoa powders to be defined hereafter, this mixture of pyrazines can be present at a level of from about 12 to about 60 ppm, preferably at a level of from about 14 to about 35 ppm.

Besides these pyrazines, there are numerous other flavor and aroma compounds generated during the roasting of cacao beans which are present in natural chocolate flavor systems of the present invention. These other flavor/aroma compounds are also generally Maillard-type products which result from the reaction of amino acids and reducing sugars. The level of the mixture of pyrazines defined above is used as a quantitative measure of the over-all intensity of the flavor/aroma compounds in the particular chocolate flavor system.

Another key aspect of the natural chocolate flavor systems of the present invention are the following two ratios: (1) 2,5/2,6-dimethyl pyrazines to trimethyl pyrazine; and (2) 2,5/2,6-dimethyl pyrazines to tetramethyl pyrazine. These particular ratios are a sensitive measurement of the degree of roasting of the particular chocolate flavor system. The ratio of the 2,5/2,6-dimethyl pyrazines to trimetyl pyrazine can be from about 0.7 to about 3, and is preferably from about 1 to about 2. The ratio of these dimethyl pyrazines to tetramethyl pyrazine can be from about 0.7 to about 3, and is preferably from about 1 to about 2.

The method for determining the level and ratios of the above pyrazines is described as follows:

1. General Approach

This method is applicable to the quantitation of methyl, 2,3-dimethyl, 2,5/2,6-dimethyl, trimethyl, tetramethyl and ethyl pyrazines in dark chocolate, chocolate chips, chocolate liquors and cocoa powders. Pyrazines in the chocolate product are extracted with solvents, separated by capillary gas chromatography and then quantitated with a nitrogen specific detector. Pyridine is used as an internal standard for quantitation. Spiked samples are included to measure individual pyrazine extraction efficiencies; these values are then used to calculate the absolute pyrazine levels in the samples. The nitrogen detector is calibrated daily and a calibration solution, consisting of a mixture of the pyrazines, is run periodically during the analyses to monitor the reproducibility of the detector.

2. Preparation of Standard Solutions (a) Calibration Solution. The calibration solution is used to determine the gas chromatographic response factor of each pyrazine relative to the pyridine internal standard and to monitor nitrogen detector reproducibility. This calibration solution is prepared by dissolving, in methylene chloride, the following compounds in the indicated amounts:

| Compound | Approx. Conc. (ppm) |
| --- | --- |
| pyridine | 20 |
| methyl pyrazine | 10 |
| 2,5-dimethyl pyrazine | 15 |
| ethyl pyrazine | 5 |
| 2,3-dimethyl pyrazine | 10 |
| 2,3,5-trimethyl pyrazine | 15 |
| 2,3,5,6-tetramethyl pyrazine | 15 |

(b) Pyrazine Spiking Solution. The pyrazine spiking solution is used to spike samples to be analyzed for determination of individual pyrazine extraction efficiencies. The pyrazine spiking solution is prepared by dissolving, in methanol, the following pyrazines in the indicated amounts:

| Pyrazine | Approx. Conc. (ppm) |
| --- | --- |
| methyl | 2000 |
| 2,5-dimethyl | 3000 |
| ethyl | 1000 |
| 2,5-dimethyl | 2000 |
| 2,3,5-trimethyl | 3000 |
| 2,3,5,6-tetramethyl | 3000 |

(c) Pyridine Internal Standard Solution. The pyridine internal standard solution is added to each sample analyzed for quantitation of individual pyrazines. This pyridine standard solution is prepared by dissolving a known concentration of pyridine (approximately 4,000 ppm) in methanol.

3. Sample Preparation

An appropriate amount of the sample to be analyzed is weighed into each of two 125 ml Erlenmeyer flasks (10.0 g. for chocolate liquor, chocolate chips or dark chocolate, 5.0 g. for cocoa powder). Distilled water (25.0 ml) and #3000 glass beads (5 ml) are then added to each of these flasks. One of the flasks is spiked with 50.0 microl. of the pyrazine spiking solution. Each of the flasks is capped, placed in a 50° C. shaker water bath and shaken until the sample is totally dispersed. Then, 6N HCl (5.0 ml) is added to each flask. The flasks are capped, placed in the 50° C. shaker water bath and shaken for at least 30 minutes. The hot samples from each flask are filtered through No. 4 Whatman filter paper into a beaker or flask. Then, 10.0 ml aliquots of the filtrates are transferred into 15 ml screw cap test tubes. Then, 11.0N NaOH (1.0 ml) is added to each tube. The tubes are capped, shaken well, and cooled to room temperature. The caps are then removed and methylene chloride (2.0 ml) is added; the tubes are recapped immediately. The recapped tubes are shaken vigorously for at least 1 minute, and then centrifuged to separate phases. The top layer is syphoned off and 1.0 ml of the bottom methylene chloride layer is pipetted into a 2 ml g.c. septum vial; a septum cap then is crimped on immediately. The pyridine internal standard solution (5.0 microl.) is added to each vial through the septum cap; the samples are then ready for gas chromatographic analysis.

4. Gas Chromatographic Equipment and Operating Conditions

A Hewlett-Packard Model 5880 Level IV gas chromatograph with capillary injector, autosampler and nitrogen-phosphorus detector is used. The column used is a 60 m × 0.32 mm DB-1 fused silica capillary with a 1 micron film coating. The following operating conditions are used with the chromatograph:

| | |
| --- | --- |
| Helium carrier gas | 15 psi |
| Injector volume | 1 microl., split 10:1 |
| Temperature program | 50° to 175° C. at 6° C./min., then 300° C. for 20 min. |

5. Calculations

The concentration (in ppm) of each pyrazine in the spiked and unspiked samples is determined. Then, the percent recovery of each pyrazine is determined according to the following equation:

$$\% \text{ Recovery} = \left( \frac{\frac{\text{Concentration (ppm)}}{\text{in spiked sample}} - \frac{\text{Concentration (ppm)}}{\text{in unspiked sample}}}{\text{Concentration (ppm) value for 100\% recovery}} \right) \times 100$$

Finally, the absolute level of each pyrazine in the sample is determined according to the following equation:

$$\% \text{ Absolute Level} = \left( \frac{\text{Concentration (ppm) in unspiked sample}}{\% \text{ Recovery}} \right) \times 100$$

The FIGURE is a representative gas chromatograph obtained by the previously described method for chocolate chips (51% chocolate liquor) made according to the present invention. The levels of the key pyrazines in these chocolate chips are presented in the following Table:

| Compound | Retent. Time (min.) | Area Under Peak | Uncorrected Level (ppm) | Corrected Level (ppm) |
|---|---|---|---|---|
| Pyridine* | 9.47 | 312.64 | — | — |
| Methyl | 11.64 | 22.94 | 0.46 | 0.98 |
| 2,5/2,6-Dimethyl | 14.37 | 37.48 | 0.93 | 1.53 |
| Ethyl | 14.53 | 8.59 | 0.20 | 0.32 |
| 2,3-Dimethyl | 14.64 | 9.07 | 0.21 | 0.30 |
| 2,3,5-Trimethyl | 17.26 | 31.84 | 0.91 | 1.22 |
| 2,3,5,6-Tetramethyl | 19.88 | 43.80 | 1.43 | 1.89 |

*Internal Standard

C. Chocolate Flavored Products

The chocolate flavor system of the present invention can be used to formulate a variety of chocolate flavored products. One such group of chocolate flavored products are chocolate coatings and chocolate chips. Basically, chocolate coatings and chocolate chips comprise: (1) a confectionary fat; (2) a sugar or a sugar alcohol; (3) emulsifiers; (4) optional ingredients; and (5) t he chocolate flavor system of the present invention.

The confectionary fat used in these chocolate products can be derived from naturally occurring sources, as well as synthetically prepared fats. Suitable confectionary fats include cocoa butter, cocoa butter substitutes derived by solvent fractionation of palm oil, illipe butter, and shea butter, and like natural occurring fats (see for example the palm oil-based fats of U.S. application Ser. No. 684,515 to Baker et al. filed Dec. 21, 1984, which is incorporated by reference); synthetic cocoa butter substitutes such as those prepared by esterification of 1,3-diglycerides with oleic anhydride, (see for example U.S. Pat. No. Re. 28,737, to Yetter, reissued Mar. 16, 1976, which is incorporated by reference); as well as hard butters derived from lauric acid based fats and hydrogenated vegetable fats. The particular amount of confectionary fat used in the chocolate products of the present invention frequently depends upon the application for which it is used. For coatings, the confectionary fat preferably comprises from about 33 to about 40% by weight of the chocolate product. For chocolate chips, the confectionary fat preferably comprises from about 25 to about 32% by weight of the chocolate product.

Sugar is typically present in chocolate products of the present invention at from about 40 to about 60% by weight. The source of sugar needs to be essentially dry. Sources of sugar include sucrose, fructose, glucose, dextrose, and mixtures thereof. The sugar usually has a average particle size of from about 0.0004 to about 0.00016 inches (from about 10 to about 40 microns) in the chocolate product. For diet chocolate products, the sugar can be completely or partially substituted with a sugar alcohol. Suitable sugar alcohols include sorbitol, xylitol, mannitol, and mixtures thereof.

Chocolate products of the present invention usually include an emulsifier to "wet" the sugar particles with the confectionary fat. Suitable emulsifiers include sorbitan monostearate, polysorbate 60, and particularly lecithin. These emulsifiers are usually present at up to about 1.5% by weight of the chocolate product, and typically at up to about 0.5% by weight. Preferred levels of emulsifier are from about 0.3 to about 0.5% by weight. Other minor ingredients, such as salt, normally present in fat based confections can also be included.

Particularly preferred chocolate products of the present invention can be formulated by combining sugar, plus any other optional ingredients, with a high level of chocolate liquor. This chocolate liquor consists essentially of the confectionary fat, plus the natural chocolate flavor system of the present invention. The level of chocolate liquor used in such chocolate products can range from about 50 to about 65% by weight of the product. This chocolate liquor can also be used to provide cocoa powders according to the present invention. These cocoa powders are obtained by pressing out and removing a substantial portion of the cocoa butter from the chocolate liquor until about 10 to about 22% cocoa butter remains. See Minifie, *Chocolate, Cocoa, and Confectionary: Science and Technology*, 2nd Ed. (AVI Publishing Company, 1980), pp 40–41 (herein incorporated by reference), which describes art-recognized methods for obtaining cocoa powder from chocolate liquor.

Suitable sources of chocolate liquor and chocolate for preparing chocolate products of the present invention are commercially available. For example, the natural chocolate liquor identified by item no. 80-002 and sold by Comet Confectionary Limited of St. Hyacinthe, Quebec, Canada is suitable.

D. Chocolate Coated Cookies and Chocolate Chip Cookies

The chocolate coatings and chocolate chips of the present invention are particularly suitable for use with certain storage-stable, dual-texture cookies. The "laminated" version of these cookies are disclosed in U.S. Pat. No. 4,455,333 to Hong et al., issued June 19, 1984, which is incorporated by reference. The laminated cookies of Hong et al. combine different doughs to produce a cookie having storage-stable, crisp and chewy textures. This is accomplished by distributing through the crumb-continuous matrix discrete regions of crumb containing readily crystallizable sugar and discrete regions of crumb containing a crystallization-resistant sugar. The result is a storage-stable plurality of textures, the regions containing crystallized sugar providing a crisp texture and the regions containing uncrystallized sugar providing a chewy texture.

In addition, U.S. Pat. No. 4,503,080 to Brabbs et al., issued Mar. 5, 1985, (herein incorporated by reference), discloses a similar storage-stable dual-textured cookie where the discrete regions of crisp texture contain a readily crystallizable sugar and the discrete regions of chewy texture a contain a readily crystallizable sugar, plus a polyol crystallization inhibitor. U.S. Pat. No. 4,344,969 to Youngquist et al., issued Aug. 17, 1982, (herein incorporated by reference) discloses yet another method for preparing such cookies from a single-dough where sugar crystallization is controlled by enzyme activity. Manipulation of water activity is one means used for activating and inactivating the enzymes of selected portions of the cookie. Thus, sugar and/or starches in the areas where the enzyme is active are converted into mixtures which are non-crystallizing, or crystallization-resistant, while the crystallization behavior of sucrose is preserved in those areas where the enzyme is inactive. The resulting dough and subsequent crumb areas of the baked cookie have storage-stable, crisp and chewy textures, respectively.

In the case of chocolate chip versions of these cookies, the cookie comprises: (1) a crumb-continuous matrix made from cookie ingredients having distributed therethrough storage-stable discrete crisp regions and discrete chewy regions; and (2) a plurality of chocolate flavored chips associated with the crumb-continuous matrix, each of the chips comprising: (a) a confectionary fat as previously defined; (b) sugar or sugar alcohol as previously defined; and (c) a natural chocolate flavor system as previously defined. These chocolate chips typically comprise from about 10 to about 35% by weight of the cookie. Preferably, these chocolate chips comprise from about 14 to about 24% by weight of the cookie.

In the case of chocolate coated versions of these cookies, the cookie comprises: (1) the previously defined crumb-continuous matrix; and (2) a chocolate flavored coating associated with this crumb-continuous matrix, which comprises (a) a confectionary fat as previously defined; (b) a sugar or sugar alcohol as previously defined; and (c) a natural chocolate flavor system according to the present invention as previously defined. This chocolate coating can completely or partially surround the crumb-continuous matrix and typically comprises from about 15 to about 45% by weight of the cookies. This chocolate-coating can be applied to the crumb-continuous portion of the cookie by standard methods for making coated-cookie products.

The crumb-continuous matrix of these dual-texture cookies, (and the inclusion of chocolate chips according to the present invention within this matrix), can be achieved by using any of the methods disclosed in the above Hong et al., Brabbs et al., and Youngquist et al. patents. The preferred cookie and cookie dough products are made by the process of preparing a first cookie dough from typical cookie ingredients containing a crystallization-resistant sugar or a sucrose or solution thereof optionally, an effective amount of a sugar crystallization inhibitor for the sucrose, preparing a second cookie dough containing a sucrose or solution thereof, and substantially enveloping the first dough with a layer of the second dough, thereby forming a ready-to-bake, laminated dough structure which is then baked to yield dual textured cookie.

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled and sandwich-type cookies), can be used.

After baking, this crumb-contimuous matrix preferably has a final water activity, $a_w$, of from about 0.25 to about 0.8, most preferably from about 0.45 to about 0.60. Cookie baking time typically ranges from about 5 minutes to about 15 minutes, depending on the number of cookies being baked, the size and shape of the cookie, the cookie ingredients, oven temperature, and like factors. The baking process can be conducted according to the methods described in the above patents. Baking can either be performed in the batch mode, as typically done in the home, or in a continuous fashion, as is often done in commercial bakeries.

E. Chocolate Flavored Culinary Mixes

The cocoa powder of the present invention is especially suitable for culinary mixes used to prepare cakes, brownies, and cookies. Basically, these culinary mixes comprise: (a) free-flowing dry ingredients, including sugar and flour; (b) shortening; and (c) the cocoa powder of the present invention associated with the dry ingredients, the shortening or both. For example, the cocoa powder of the present invention can replace wholly or partly, the cocoa used in packaged culinary mixes disclosed in U.S. Pat. No. 3,170,796 to Andre et al., issued Feb. 23, 1965, which is incorporated by reference. The cocoa powder of the present invention can also wholly or partly replace the cocoa used in the culinary mixes disclosed in U.S. Pat. No. 3,733,209 to Gupta et al., issued May 15, 1973, which is incorporated by reference. The cocoa powder of the present invention can also be used in the cocoa-flavored liquid oil compositions disclosed in U.S. Pat. No. 3,433,649 to Cooke et al., issued Mar. 18, 1969, which is incorporated by reference.

The culinary mixes of the Andre et al. patent generally comprise a discrete unit of dry ingredients, including sugar and flour, and a discrete unit of fluid shortening. The discrete fluid shortening contains at least 0.01%, by weight, of surface-active emulsifier and comprises at least 1.0% of the total culinary mix. The total amount of shortening in the mix is from about 6 to about 26%. The dry unit of ingredients can contain a part of the shortening, at a level of from 0 to about 16%, by weight of the total culinary mix.

The chocolate flavored cake mixes of the Andre et al. generally have the following range of ingredients:

| Ingredient | Percent by Weight |
| --- | --- |
| Flour | 20–50 |
| Sugar | 20–70 |
| Shortening, including emulsifier | 6–26 |
| Milk solids | 0–5 |
| Leavening | 0.5–4 |
| Hydrophilic colloids | 0–1 |
| Cocoa powder | 2–12 |
| Flavor | Minor amounts |
| Color | Minor amounts |

The exact method of compounding the dry mix is not critical, although very satisfactory results are obtained by mixing in a ribbon blender. The flour, sugar, and a part of the shortening, if it is to be included in the dry mix, are blended into a homogeneous premix. This premix can be passed through some sort of impact grinder to eliminate lumps. Additional ingredients can then be added and the whole again mixed. An additional step of impact grinding can be desirable to remove any lumps present in the final dry mix.

Another method of preparing a dry mix in which some shortening is present is by the methods disclosed in U.S. Pat. Nos. 2,874,051, 2,874,052, and 2,874,053, in which a homogeneous blend is formed containing sugar, flour and shortening, and this blend is then subjected to simultaneous shearing and crushing forces.

The discrete unit of fluid shortening must be packaged in a container which will prevent any leakage of oil into the dry mix. Except for this consideration, the exact form of composition of the container is not critical. It can be desirable to provide a transparent flexible packet, such as one made from a film combining polyethylene, polyvinylidine chloride, and copolymer of ethylene glycol and terephthalic acid.

The dry mix and the packet of fluid shortening are enclosed in an outside wrapping, preferably in the form of a rigid container, but maintained as discrete units within the wrapping.

The chocolate flavored cake mixes of the Gupta et al. patent generally have the following ingredients:

| Ingredient | Percent By Weight |
|---|---|
| Flour | 30-40 |
| Sugar | 30-45 |
| Shortening, preferably containing emulsifiers and high temperature batter stabilizers | 9-15 |
| Leavening soda | 1.5-3 |
| Leavening acid | 0.2-1.5 |
| Lactose | 0.25-1.5 |
| Cocoa powder | 2-12 |
| Non-fat dry milk solids | 0.25-2 |
| Salt | 0-2 |
| Flavoring, coloring, water binders | Optional |

Prepared brownie mixes of the Gupta et al. patent generally have the following ingredients:

| Ingredients | Percent By Weight |
|---|---|
| Sugar | 45-75 |
| Flour | 20-30 |
| Shortening, preferably containing emulsifier and high temperature stabilizers | 4-20 |
| Cocoa powder | 2-12 |
| Leavening soda | 0.005-1 |
| Leavening acid | 0-0.05 |
| Lactose | 0.25-1.5 |
| Non-fat dry milk solids | 0.25-2 |
| Flavoring, coloring, salt | Optional |

The prepared cake and brownie mixes of Gupta et al. can be obtained as in the Andre et al. patent.

The cocoa-flavored liquid oil compositions of the Cooke et al. patent basically comprise pourable, storage-stable mixtures of an edible liquid oil and the cocoa powder of the present invention which have been aerated to a density of 0.80 g./cc. to 0.95 g./cc. The oil in the mixture has a fluidity of from about 3 to about 12; the cocoa has an average particle size of less than about 40 microns and comprises from about 10 to about 30% by weight of the composition.

The cocoa powder is admixed with the liquid oil in any amount from about 10 to about 30% by weight of the total composition. Amounts of cocoa powder less than about 10% by weight of the composition can be used; however, the color of the product tends to be somewhat insipid. While amounts of cocoa powder greater than about 30% by weight of the composition can be used, compositions containing higher amounts of cocoa powder are not reliably fluid. A preferred composition contains from about 15 to about 20% cocoa powder by weight of the composition.

The manner of incorporating the cocoa powder in the liquid oil of the Cooke et al. patent is disclosed at Col. 3, lines 2-53. As described at Col. 3, lines 53-70, this flavored oil can be used with any culinary mix, including prepared cake and brownie mixes which requires chocolate flavor.

SPECIFIC EMBODIMENTS OF THE PRESENT INVENTION

The following specific embodiments are used to illustrate the present invention:

A. Chocolate Chip Cookies

The chocolate formulation used in making the chocolate chip is as follows:

| Ingredient | % by Weight |
|---|---|
| Chocolate liquor* | 52.5 |
| Sucrose | 47.0 |
| Lecithin | 0.4 |
| Ethyl vanillin | 0.1 |

*Item No. 80-002 sold by Comet Confectionary Limited.

The above chocolate formulation is made into chocolate according to the method described in Minifie, *Chocolate, Cocoa and Confectionary*, supra at pages 113-26, and then deposited to form chocolate chips. These chocolate chips are then used in the following chocolate chip cookie formulation:

| Ingredients | Weight Percent |
|---|---|
| Outer Dough (First Dough) | |
| Shortening | 19.0 |
| Distilled monoglycerides | 0.6 |
| Water | 9.5 |
| Molasses | 1.5 |
| Baking soda | 0.5 |
| Sugar (sucrose) | 34.5 |
| Egg yolk solids | 1.0 |
| Flour | 32.5 |
| Salt | 0.7 |
| Starch | 0.1 |
| Egg white solids | 0.1 |
| Inner Dough (Second Dough) | |
| Shortening | 13.5 |
| Distilled monoglycerides | 0.4 |
| Polyglycerol esters | 0.1 |
| Diacetyl tartaric acid esters of monoglycerides | 0.1 |
| Water | 0.5 |
| Baking soda | 0.4 |
| High fructose corn syrup | 22.0 |
| Sugar | 9.0 |
| Flour | 23.1 |
| Salt | 0.5 |
| Starch | 1.3 |
| Egg White Solids | 0.1 |

-continued

| Ingredients | Weight Percent |
| --- | --- |
| Chocolate chips | 29.0 |

The outer dough is prepared by first mixing the water with the molasses and soda. The shortening and distilled monoglyceride are then added and the ingredients are mixed for 3 to 4 minutes. The sugar is then added and the ingredients mixed again. All the remaining ingredients are then mixed in, resulting in a 29.7 lb. batch of dough.

The inner dough is formed by mixing the ingredients in the following order: the high fructose corn syrup and water are mixed, then the shortening, distilled monoglycerides, polyglycerol esters, and diacetyl tartaric acid esters of monoglycerides are added and mixed. The sugar is added and mixed, and then the flour, other dry ingredients, and chocolate chips are mixed in.

The doughs are coextruded with a noncommercial double ram extruder. The extruder produces a two-dough, concentrically arranged rope. An equivalent coextruder can be employed such as a Rheon ® encrusting machine, Model 207 available from Rheon Automotive Machinery Company of Japan, or coextruder Model No. DDP 200-9005, available from Bepex Hutt GmbH, Postfach 9, Daimlerstrasse 9, D-7105, Leingarten, West Germany. Then doughballs are formed weighing about 13.4 grams each. The doughballs are placed onto stainless steel trays and baked in a Middleby-Marshall Oven (Model JS250) at 305+ F. for about 7.2 minutes to make cookies. The cookies are cooled, packaged, and stored.

B. Chocolate Coated Cookie

The crumb portion of the cookies is prepared as described above. After the cookies are baked, a chocolate formulation is prepared as described. The baked cookies are dipped in the molten chocolate and then cooled to form chocolate coated cookies.

C. Cake Mix

A dry mix is made having the following composition:

| Ingredient | Parts by Weight |
| --- | --- |
| Sugar | 51.42 |
| Cake flour | 32.18 |
| Shortening | 7.76 |
| Salt | 0.53 |
| Sodium bicarbonate | 0.95 |
| Sodium aluminum phosphate | 0.25 |
| Potato flour | 0.25 |
| Flavor | 0.04 |
| Cocoa powder* | 6.62 |

*Obtained from chocolate liquor, item no. 80-002 sold by Comet Confectionary Limited.

Twenty oz. of this mix is placed in a polyethylene bag. One-and-a-half oz. of the shortening is placed in a flexible packet, whose walls are a film combining polyethylene, polyvinylidine chloride, and copolymer of ethylene glycol and terephthalic acid. The shortening comprises soybean oil hydrogenated to an I.V. of 107 and contains about 2% of soybean oil hydrogenated to an I.V. of 8, 4.8% of propylene glycol monostearate, 3.2% of superglycerinated hydrogenated soybean oil, and 1.3% stearic acid.

Both of these discrete units are placed in a cardboard container.

D. Brownie Mix

The brownie mix is composed of two parts:

| (a) | a dry milk packet containing all dry ingredients; |
| --- | --- |
| (b) | a flavor packet containing a liquid shortening, cocoa powder and artificial flavoring. |

The compositions of the dry mix and the flavor packets are shown below:

| Ingredients | Percent by Weight |
| --- | --- |
| (a) Dry Mix | |
| Sugar (sucrose) | 59.025 |
| Hard wheat flour | 26.420 |
| Shortening containing monoglyceride and freshness preserver | 6.230 |
| Cocoa powder* | 5.940 |
| Salt (NaCl) | 0.890 |
| Leavening soda | 0.020 |
| Non-fat dried milk solids | 1.000 |
| Lactose | 0.375 |
| Vanillin | 0.100 |
| Total | 100.000 |
| (b) Flavor Packet | |
| Liquid shortening | 79.9 |
| Cocoa Powder* | 20.0 |
| Vanillin | 0.1 |
| Total | 100.0 |

*Obtained from chocolate liquor, item no. 80-002 sold by Comet Confectionary Limited.

The dry mix preparation has been described earlier in this application. The flavor packet is prepared by mixing all the ingredients in a paddle type, shear type, or impeller agitated type mixer. The density and the viscosity of the finished packet material are controlled to control the consistency of the packet material.

E. Cocoa Flavored Oil

A cocoa-flavored liquid oil composition is prepared using a partially hydrogenated soybean oil having a fluidity of 7.6. The fluidity of the oil is determined at an oil temperature of 70° F. with a fluidometer comprising a Saybolt cup and Furol orifice have a bore of 0.1237±0.0003 inch mounted on an electric timing device which controls the flow of the oil through the fluidometer for a 30-second time interval. The cocoa powder which is dispersed in the liquid oil has an average particle size of about 14 microns; 25% of the particles are greater than 14.8 microns, 50% are greater than 11.0 microns, and 75% are greater than 7.8 microns. The fat content of the cocoa powder is 14.8%.

The cocoa powder is uniformly mixed in 100 pounds of oil in an amount equal to 20% by weight of the total composition using a conventional Hobart mixer. Speed 1 on the Hobart mixer (about 65 rpm.) is used to wet the cocoa particles and to uniformly disperse the cocoa powder in the oil. A higher speed, Speed 2 (about 115 rpm.), is used to "whip" air into the mixture.

We claim:

1. A chocolate chip cookie, which comprises:
   (1) a crumb-continuous matrix made from cookie ingredients having distributed therethrough storage-stable discrete crisp regions and discrete chewy regions, said crumb-continuous matrix having an a$_W$ value of from about 0.45 to about 0.60; and (2) a plurality of chocolate flavored chips associated with said crumb-continuous matrix, each of said chips comprising:
  (a) a confectionary fat;
  (b) a sugar or sugar alcohol; and
  (c) a natural chocolate flavor system having:
    (1) at least about 21% cocoa solids by weight of each said chips;
    (2) from about 3.5 to about 14 ppm of a mixture of methyl, ethyl, 2,3-dimethyl, 2,5- and 2,6-dimethyl, 2,3,5-trimethyl, and 2,3,5,6-tetramethyl pyrazines; and
    (3) a ratio of 2,5- and 2,6-dimethyl pyrazines to 2,3,5-trimethyl pyrazine of from about 1 to about 2 and a ratio of 2,5- and 2,6-dimethyl pyrazines to 2,3,5,6-tetramethyl pyrazine of from about 1 to about 2.

2. The cookie of claim 1 wherein said chocolate chips comprise from about 10 to about 35% by weight of the cookie.

3. The cookie of claim 2 wherein said cocoa solids comprise from about 21 to about 35% by weight of each of said chips.

4. A chocolate coated cookie, which comprises:
(1) a crumb-continuous matrix made from cookie ingredients having distributed therethrough storage-stable discrete crisp regions and discrete chewy regions, said crumb-continuous matrix having an a$_W$ value of from about 0.45 to about 0.60; and
(2) a chocolate flavored coating partially or completely surrounding said crumb-continuous matrix, and which comprises
  (a) a confectionary fat;
  (b) a sugar or sugar alcohol; and
  (c) a natural chocolate flavor system having:
    (1) at least about 16% cocoa solids by weight of said coating;
    (2) from about 3.5 to about 14 ppm of a mixture of methyl, ethyl, 2,3-dimethyl, 2,5- and 2,6-dimethyl, 2,3,5-trimethyl, and 2,3,5,6-tetramethyl pyrazines; and
    (3) a ratio of 2,5- and 2,6-dimethyl pyrazines to 2,3,5-trimethyl pyrazine of from about 1 to about 2 and a ratio of 2,5- and 2,6-dimethyl pyrazines to 2,3,5,6-tetramethyl pyrazine of from about 1 to about 2.

5. The cookie of claim 4 wherein said chocolate coating comprises from about 15 to about 45% by weight of the cookie.

6. The cookie of claim 5 wherein said cocoa solids comprise from about 21 to about 35% by weight of said chocolate coating.

* * * * *